United States Patent
Ruemelin et al.

(10) Patent No.: US 10,843,709 B2
(45) Date of Patent: Nov. 24, 2020

(54) ARRANGEMENT, VEHICLE AND METHOD FOR HAVING AN OCCUPANT OF A VEHICLE THAT IS IN A HIGHLY AUTOMATED DRIVING MODE TAKE OVER A DRIVING TASK

(71) Applicant: Bayerische Motoren Werke Aktiengesellschaft, Munich (DE)

(72) Inventors: Sonja Ruemelin, Munich (DE); Philipp Kerschbaum, Munich (DE); Annemarie Scheibner, Munich (DE); Lucas Bock, Munich (DE); Christian Guerrero, Munich (DE); Phuong-Anh Vu, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 262 days.

(21) Appl. No.: 15/993,242

(22) Filed: May 30, 2018

(65) Prior Publication Data
US 2018/0273053 A1  Sep. 27, 2018

Related U.S. Application Data

(63) Continuation of application No. PCT/EP2016/075250, filed on Oct. 20, 2016.

(30) Foreign Application Priority Data

Nov. 30, 2015  (DE) .......................  10 2015 223 688

(51) Int. Cl.
*B62D 1/11* (2006.01)
*B60W 50/16* (2020.01)
(Continued)

(52) U.S. Cl.
CPC ............ *B60W 50/16* (2013.01); *B60W 30/12* (2013.01); *B62D 1/046* (2013.01); *B62D 1/06* (2013.01);
(Continued)

(58) Field of Classification Search
None
See application file for complete search history.

(56) References Cited

U.S. PATENT DOCUMENTS 6,236,306 B1 *  5/2001  Liebelt .................... G08B 6/00
                                              340/4.12
6,398,712 B1 *  6/2002  Hendricksen ............ A61N 2/00
                                              600/9
(Continued)

FOREIGN PATENT DOCUMENTS

DE       198 52 315 A1    5/2000
DE  10 2006 023 287 A1   12/2007
(Continued)

OTHER PUBLICATIONS

International Search Report (PCT/ISA/210) issued in PCT Application No. PCT/EP2016/075250 dated Jan. 17, 2017 with English translation (four (4) pages).
(Continued)

*Primary Examiner* — Jonathan M Dager
(74) *Attorney, Agent, or Firm* — Crowell & Moring LLP

(57) ABSTRACT

A method for having an occupant of a vehicle that is in a highly automated driving mode take over a driving task includes the steps of determining that the occupant has taken over the driving task and, in response thereto, automatically actuating a handle element, which can change its shape, in order to affect the haptics of a rim of a steering wheel of the vehicle.

10 Claims, 2 Drawing Sheets

(51) Int. Cl.
- *B62D 1/04* (2006.01)
- *B62D 1/06* (2006.01)
- *B62D 1/28* (2006.01)
- *B60W 30/12* (2020.01)
- *B60W 50/00* (2006.01)

(52) U.S. Cl.
CPC ..... *B62D 1/286* (2013.01); *B60W 2050/0072* (2013.01)

(56) References Cited

U.S. PATENT DOCUMENTS

| | | | | |
|---|---|---|---|---|
| 6,745,468 | B1* | 6/2004 | Schmitt | B21D 22/04 29/34 R |
| 7,414,520 | B2* | 8/2008 | Meißner | B60K 37/06 340/438 |
| 7,852,225 | B2* | 12/2010 | Lemasson | B62D 1/046 340/576 |
| 8,502,433 | B2* | 8/2013 | Zanella | B23K 37/0252 310/328 |
| 8,818,608 | B2* | 8/2014 | Cullinane | B60W 60/0051 701/23 |
| 9,278,705 | B2* | 3/2016 | Murata | B60Q 9/00 |
| 9,598,098 | B2* | 3/2017 | Sakurai | B60W 50/16 |
| 9,738,302 | B2* | 8/2017 | Sakurai | H02K 7/061 |
| 9,994,231 | B2* | 6/2018 | Di Censo | B60K 37/06 |
| 10,005,177 | B2* | 6/2018 | Rimatzki | B62D 1/06 |
| 10,023,115 | B2* | 7/2018 | Kelly | B60W 50/16 |
| 10,232,737 | B2* | 3/2019 | Wang | B60K 26/02 |
| 10,507,860 | B2* | 12/2019 | Adachi | B62D 1/04 |
| 10,525,986 | B2* | 1/2020 | Garcia | B62D 1/06 |
| 10,543,871 | B2* | 1/2020 | Torii | B62D 15/0215 |
| 2002/0104705 | A1* | 8/2002 | Kuhn, Jr. | B62D 1/06 180/333 |
| 2005/0134470 | A1* | 6/2005 | Bos | A63B 60/46 340/665 |
| 2005/0268744 | A1* | 12/2005 | Embach | B62D 1/06 74/551.9 |
| 2006/0022442 | A1* | 2/2006 | Rubboli | B62D 1/06 280/731 |
| 2007/0198145 | A1* | 8/2007 | Norris | G05D 1/021 701/23 |
| 2010/0198458 | A1* | 8/2010 | Buttolo | G01C 21/3652 701/36 |
| 2010/0228417 | A1* | 9/2010 | Lee | B62D 15/025 701/23 |
| 2010/0282018 | A1* | 11/2010 | Bazinski | B62D 1/06 74/558 |
| 2011/0133919 | A1* | 6/2011 | Evarts | B60W 40/08 340/439 |
| 2011/0245643 | A1* | 10/2011 | Lisseman | B62D 1/046 600/372 |
| 2012/0126965 | A1* | 5/2012 | Sanma | B62D 15/029 340/438 |
| 2013/0032002 | A1* | 2/2013 | Kuntzel | B62D 1/06 74/558 |
| 2013/0131906 | A1* | 5/2013 | Green | G08G 1/00 701/23 |
| 2014/0244131 | A1 | 8/2014 | Mielich et al. | |
| 2014/0277896 | A1* | 9/2014 | Lathrop | B62D 1/06 701/23 |
| 2015/0006014 | A1* | 1/2015 | Wimmer | B60K 26/02 701/23 |
| 2015/0123947 | A1* | 5/2015 | Jubner | B62D 1/046 345/175 |
| 2015/0191198 | A1 | 7/2015 | Perichon et al. | |
| 2015/0197283 | A1* | 7/2015 | Marti | B62D 15/029 701/41 |
| 2015/0307022 | A1* | 10/2015 | Nelson | B60W 50/16 701/36 |
| 2016/0001781 | A1* | 1/2016 | Fung | G16H 50/20 701/36 |
| 2016/0159396 | A1* | 6/2016 | Watanabe | B62D 1/04 701/36 |
| 2016/0202700 | A1* | 7/2016 | Sprigg | B60W 30/00 701/23 |
| 2016/0368522 | A1* | 12/2016 | Lubischer | B62D 1/183 |
| 2016/0378114 | A1* | 12/2016 | Laur | B60W 60/0053 701/23 |
| 2017/0015331 | A1* | 1/2017 | Laur | G05D 1/0061 |
| 2017/0151950 | A1* | 6/2017 | Lien | B60W 50/0098 |
| 2017/0341683 | A1* | 11/2017 | Haba | B62D 1/046 |
| 2018/0017968 | A1* | 1/2018 | Zhu | B62D 1/046 |
| 2018/0074497 | A1* | 3/2018 | Tsuji | G08G 1/096888 |
| 2019/0204827 | A1* | 7/2019 | Bhalla | G05D 1/0061 |
| 2019/0258389 | A1* | 8/2019 | Jubner | G06F 3/0416 |
| 2020/0089226 | A1* | 3/2020 | Breisinger | B60K 35/00 |

FOREIGN PATENT DOCUMENTS

| | | |
|---|---|---|
| DE | 199 27 464 B4 | 9/2008 |
| DE | 10 2009 050 404 A1 | 5/2011 |
| DE | 10 2013 003 187 A1 | 9/2014 |
| DE | 10 2014 226 154 A1 | 7/2015 |
| DE | 10 2015 207 097 A1 | 10/2015 |
| DE | 10 2015 119 985 A1 | 6/2016 |
| EP | 2 692 528 A1 | 2/2014 |

OTHER PUBLICATIONS

German-language Written Opinion (PCT/ISA/237) issued in PCT Application No. PCT/EP2016/075250 dated Jan. 17, 2017 (five (5) pages).

German-language Search Report issued in Application No. 10 2015 223 688.9 dated Aug. 31, 2016 with partial English translation (twelve (12) pages).

* cited by examiner

ARRANGEMENT, VEHICLE AND METHOD FOR HAVING AN OCCUPANT OF A VEHICLE THAT IS IN A HIGHLY AUTOMATED DRIVING MODE TAKE OVER A DRIVING TASK

CROSS REFERENCE TO RELATED APPLICATIONS

This application is a continuation of PCT International Application No. PCT/EP2016/075250, filed Oct. 20, 2016, which claims priority under 35 U.S.C. § 119 from German Patent Application No. 10 2015 223 688.9, filed Nov. 30, 2015, the entire disclosures of which are herein expressly incorporated by reference.

BACKGROUND AND SUMMARY OF THE INVENTION

The present invention relates to an arrangement, a means of locomotion such as a vehicle and a method for having an occupant of a means of locomotion that is in a highly automated driving mode take over a driving task. In particular, the present invention relates to a suitable haptic feedback to the occupant in response to assuming the driving task.

Highly automated driving modes are realized in the prior art through arrangements that are more and more suitable for this purpose. These arrangements include sensors and evaluation units by which commands are generated for the longitudinal and/or lateral guidance of a vehicle which relieve the driver up to a complete absence of participation in the driving events.

Adjustment possibilities for anthropomorphic features in the vehicle are furthermore being proposed currently for the outside mirror, inside mirror, steering wheel position and seat. The technology behind this is based on materials which can deform, such as for example dielectric elastomer actuators (DEA), which can expand or shrink in each case depending on the applied voltage. These materials can, additionally, be used for the determination of pressure. The effect can be further increased through the use of stacked actuators.

EP 2 692 528 A1 discloses an arrangement of stacked actuators for ascertaining pressure. Each single layer is used here for the determination of a part of a total deflection, so that with n layers an n-fold deflection results, without the other operating parameters having to be changed.

Alternatively, changes in shape can be realized through chambers that can be filled with air (cf. massage cushions in a massage chair) or liquids, or through magnetorheological liquids that can be made to change shape through the application of voltage.

DE 10 2006 023 287 A1 and DE 199 27 464 B4 disclose steering wheels for motor vehicles with pressure sensors for the reception of user inputs.

On the basis of the above-mentioned prior art, it is an object of the present invention to output a suitable feedback with respect to the successful takeover of the driving task to an occupant of a vehicle which is in a highly automated driving mode.

The object identified above is achieved according to the invention by a method for having an occupant of a vehicle that is in a highly automated driving mode take over a driving task. A "highly automated driving mode" ("HADM") here refers in particular to such a driving mode that makes a lateral guidance or steering manipulations by the occupant unnecessary. According to the invention, it is first ascertained that the occupant has taken over the driving task. In other words, it is automatically ascertained that the driver is ready to assume the driving task. In response to this, a deformable handle element of a steering wheel rim of a steering wheel of the vehicle is automatically driven to affect its haptics. In other words, a change in the shape of the handle element is permitted or even performed in response to an automatically generated drive signal. This takes place in particular independently of a change in the shape of the steering wheel rim induced by muscular force. Nevertheless, it is not ruled out that the change in shape of the handle element according to the invention is associated with a change in shape induced at least partially by muscular force. Thus, according to the invention, a haptic feedback is output to the occupant indicating that the responsibility for driving has been fully handed over to the driver from a driving robot of the vehicle. Acoustic outputs or visual indications relating to the successful handover of responsibility are therefore unnecessary, whereby the user acceptance for correspondingly designed means of locomotion and systems is increased.

The determination that the occupant has fully taken over the driving task can be made in response to the steering wheel rim being gripped. Touching the steering wheel rim can, for example, be determined by sensors. Alternatively or in addition, a visual determination of the gripping action in respect of the steering wheel rim can take place. Speech inputs, or pressing other switch surfaces to express the occupant's desire to take over, are in this way made unnecessary.

Preferably, the determination that the occupant has fully taken over the driving task can take place in response to a signal of a suitable sensor. For example, a touch-sensitive sensor (e.g. integrated into the steering wheel rim), a pressure sensor (e.g. integrated into the steering wheel rim), an optical sensor (e.g. an interior camera) and/or a speech analysis system can be used to identify the user's wish to take over the driving task. Apart from the speech analysis system, the above-mentioned sensors can also be used to analyze a position of the hand of the user with reference to the steering wheel rim, and thus to have an influence on the change in shape of the handle element.

The deformable handle element can, for example, be changed in shape depending on a metrological capture of a size and/or shape of a hand of the occupant. In other words, the hand of the occupant is captured by sensors, measured, and a suitable change in the shape of the handle element is induced in such a way that the hand of the user nestles particularly comfortably into a corresponding shape in the steering wheel rim. Alternatively or in addition, the occupant can be identified by sensors, and then assigned to a previously defined data set representing a size and/or a shape of said occupant's hand. The predefined data set can then be used to induce a suitable change in shape of the handle element without a new measurement of the user's hand being necessary. Such a data set can, for example, be predefined by the user in a configuration step in order to configure the haptic experience when gripping the steering wheel rim in a particularly advantageous and comfortable manner.

The change in shape of the handle element can, for example, be developed by means of an electrorheological fluid and/or by means of a magnetorheological fluid which is/are enclosed in a deformable volume. Depending on the operating principle, it can be provided that an electrical or magnetic field is applied to the fluid in order to engender or to enable its change in shape. A plastic deformability of the fluid can, for example, be generated in that a previously applied field is switched off. If the occupant seizes the steering wheel rim at such a moment, said occupant's hands form appropriate grip recesses in the deformable handle element which can then be fixed through the application of a suitable field. Similarly, it is also possible for a mechanical, solid-body actuator and/or an air pocket to be provided as the deformable handle element, by which the deformable handle element can be changed in shape or made deformable. Any desired combination of the above-mentioned operating principles can, of course, be used for the deformable handle element.

Whenever the occupant wants to surrender the driving task, a successful determination of this intention can be acknowledged in that a state of the deformable handle element of the steering wheel rim of the steering wheel of the means of locomotion before the occupant took over the driving task is automatically restored. For example, in response to the occupant releasing the steering wheel rim, an electrical signal for fixing the deformable handle element can be switched off in order to permit a homogeneous distribution of the fluid in the deformable handle element, or to move to a base position in the case of a mechanical, solid-body actuator in the deformable handle element. In this way the occupant receives a suitable haptic and/or optical feedback regarding the successful surrender of the driving task or the successful transfer of the driving task to the vehicle.

The change in shape of the deformable handle element can be performed depending on an actual position of a hand of the occupant. In other words, the deformable handle element can be adapted to the hand of the user at such a position at which the user is performing an approach to the steering wheel rim or at which the occupant is already touching the steering wheel rim. In this way, an essentially constant haptic feedback regarding takeover of the driving task can be output independently of a gripping position chosen by the occupant.

According to a second inventive aspect, an arrangement for a vehicle is proposed by which the advantages of the first-mentioned inventive aspect can be implemented in a corresponding manner. The arrangement comprises a steering wheel (also "steering hand wheel") with a steering wheel rim for lateral guidance of the vehicle, a deformable handle element in the steering wheel rim for influencing the haptics of the steering wheel rim, and an evaluation unit which includes a signal input and a signal output. The evaluation unit can be an element of an electronic control device and, for example, have a programmable processor. The evaluation unit is designed to ascertain through the signal input that an occupant of the vehicle has taken over the driving task from a highly automated driving mode or is trying to take over the driving task. In response to this, the evaluation unit can, through the signal output, automatically control the deformable handle element to affect the haptics of the steering wheel rim of the steering wheel of the vehicle. The arrangement according to the invention thus outputs a haptic feedback to the occupant, indicating that said occupant now has the responsibility for the lateral guidance and/or longitudinal guidance of the vehicle.

According to a third aspect of the present invention, a vehicle (e.g. an automobile, a transporter, a truck, a motorcycle, an aircraft and/or a water vessel) is proposed which comprises an arrangement according to the second-mentioned inventive aspect. In particular, the vehicle is fitted with a driving robot, by which a highly automated driving mode is optionally possible. The features, combinations of features and the advantages yielded by these clearly correspond to those that have been explained in connection with the first-mentioned inventive aspect in such a way that, for the avoidance of repetitions, we refer to the above explanations.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
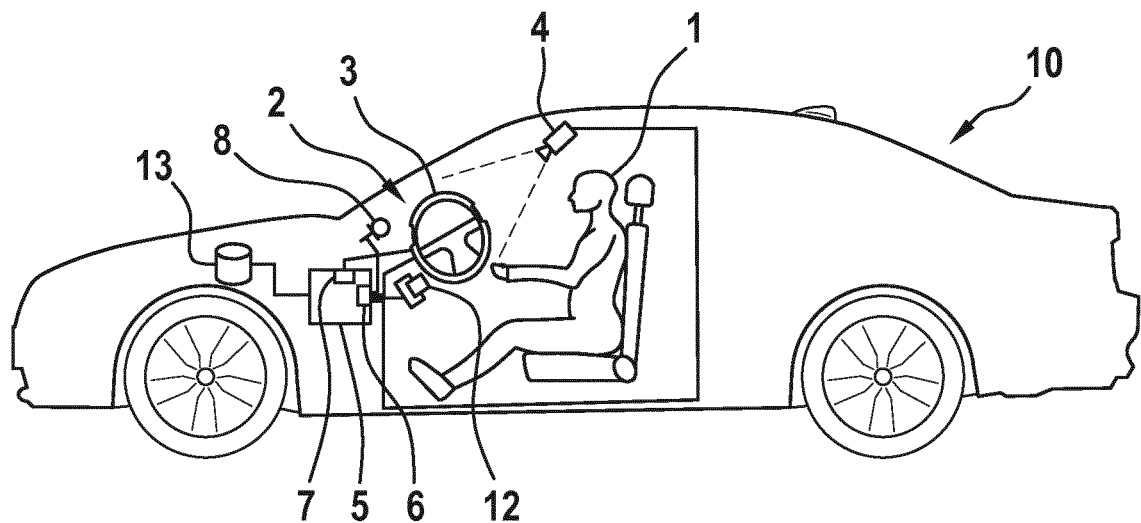
FIG. 1 is a schematic view of an exemplary embodiment of a vehicle designed in accordance with the invention with an exemplary embodiment of an arrangement designed according to the invention.

FIG. 1 shows an automobile 10 which includes an exemplary embodiment of an arrangement according to the invention. A steering wheel 2 has a steering wheel rim 3 which is located within the capture region of an interior camera 4. The interior camera 4 is connected through information technology with a signal input 6 of an electronic control device 5 as an evaluation unit. A microphone 8 of a speech processing system is also connected through information technology to the signal input 6 for accepting speech commands of the occupant 1. The electronic control device 5 can identify the occupant 1 by means of a radio key 12 and can call up predefined data sets, stored in a data memory 13, representing a size and a shape of a hand of the occupant 1. The electronic control device 5 can control the steering wheel rim 3 through a signal output 7 in such a way that suitable changes in the shape of the handle element (not illustrated in FIG. 1) are made to influence the haptics of the steering wheel rim 3. A position of the hand of the occupant 1 on the steering wheel rim 3 can be identified by a touch-sensitive surface (not illustrated) and reported to the electronic control device 5 over a signal line connected to the signal input 6.

Figure 2:
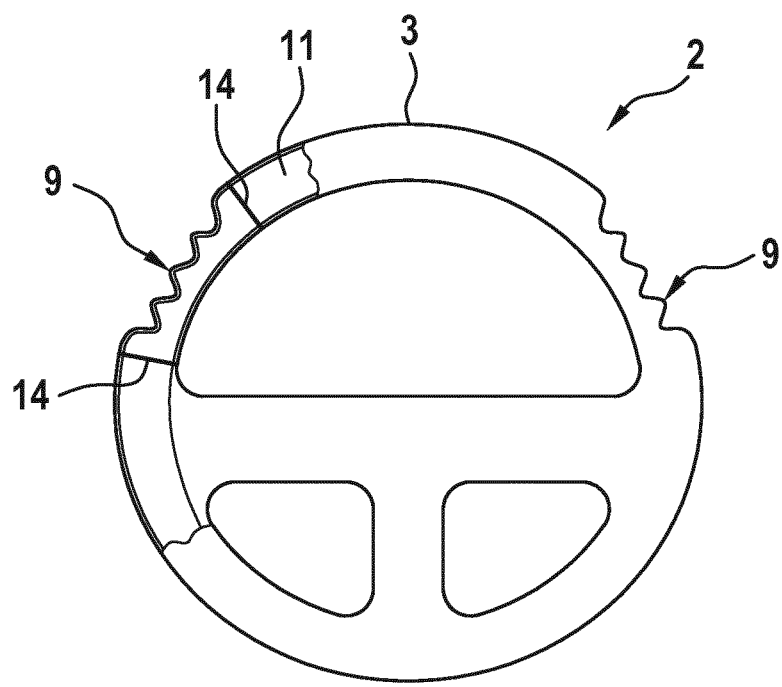
FIG. 2 shows a partially cut-away illustration of an exemplary steering wheel that can be used according to the invention.

FIG. 2 shows a partially cut-away illustration of an exemplary embodiment of a steering wheel 2 that can be used according to the invention. A plastically deformable volume with an electrorheological fluid is provided as the deformable handle element 11 in the steering wheel rim 3. Through the application of a suitable electrical field to the electrodes 14 inside the steering wheel rim 3, gripping recesses 9 generated by muscular force in the surface of the steering wheel rim 3 can be fixed or conserved, in order to give the occupant a haptic feedback regarding the successful handover of the driving task.

Figure 3:
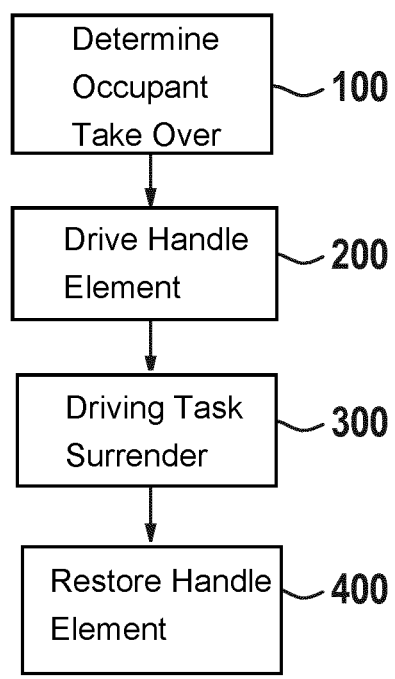
FIG. 3 is a flow diagram illustrating steps of an exemplary embodiment of a method according to the invention for the takeover of a driving task by an occupant of a vehicle that is in a highly automated driving mode.

FIG. 3 shows steps of a method for the takeover of a driving task by an occupant. It is determined in step 100 that the occupant has taken over the driving task. In response to that, in step 200, a deformable handle element is automatically controlled (driven) to influence the haptics of the steering wheel rim of the steering wheel of the vehicle in order to conserve a shape of the handle element. In step 300, it is automatically determined that the occupant has surrendered the driving task or wishes to surrender the driving task and in response to that, in step 400, a previous state of the deformable handle element of the steering wheel rim of the steering wheel of the vehicle is automatically restored.

According to the invention, the steering wheel thus adapts to the needs of the driver. In this way, for example, the circumference of the region to be gripped can be reduced or increased, or a thumb rest can be made stronger or weaker. Hand data can, for example, come from various sources. Thus, for example, the driver can be recognized by means of a camera system and associated with data stored in a database. Alternatively, the size and/or shape of the hand can be captured by a camera available in the vehicle (e.g. for capturing gestures or recognizing tiredness). Pressure data can originate from additionally integrated sensors or can, however, be integrated into the actuators (e.g. in dielectric polymers). As soon as the size and/or shape of the hand is captured, the steering wheel can be shaped so that the hands lie comfortably and steering wheel buttons are reachable comfortably. The adaptation optionally only takes place at the beginning of travel/when stationary, if there is a fear that the shaping could result in an unwanted distraction of the occupant. Optionally, if pressure sensors are used in the steering wheel, a shaping can also take place with the active application of pressure. Steering wheel regions that stand in the path of a comfortable placement of the hands experience more pressure, in response to which these regions can then be reduced. Pressure can optionally be used as an input parameter in order to affect the driving mode (manual vs. automated driving).

As a result, the present invention permits an increase in comfort, a personalization and an improvement in driving safety in connection with highly automated driving modes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Occupant
2 Steering wheel
3 Steering wheel rim
4 Interior camera
5 Electronic control device
6 Signal input
7 Signal output
8 Microphone
9 Grip recess
10 Vehicle
11 Deformable handle element
12 Radio key
13 Data memory
14 Electrode
100 -
400 Method steps

What is claimed is:

1. A method for taking over a driving task by an occupant of a vehicle that is in a highly automated driving mode, the method comprising the steps of:
determining that the occupant has taken over the driving task and, in response to that:
automatically controlling an ergonomically shaped deformation of a deformable handle element to affect haptics of a steering wheel rim of a steering wheel of the vehicle.

2. The method as claimed in claim 1, wherein
the determination that the occupant has taken over the driving task is made in response to the steering wheel rim being gripped.

3. The method as claimed in claim 1, wherein
the determination that the occupant has taken over the driving task is made in response to a signal of one or more of:
a touch-sensitive sensor,
a pressure sensor,
an optical sensor, or
a speech analysis system.

4. The method as claimed in claim 1, wherein the deformable handle element is controlled depending on:
a metrological capture of a size and/or shape of a hand of the occupant, and/or
an identification of the occupant and of a predefined data set representing a size and/or a shape of the hand of the occupant.

5. The method as claimed in claim 1, wherein the deformable handle element comprises one or more of:
an electrorheological fluid,
a magnetorheological fluid,
a mechanical, solid-body actuator, or
an air pocket.

6. A method for taking over a driving task by an occupant of a vehicle that is in a highly automated driving mode, the method comprising the steps of:
determining that the occupant has taken over the driving task and, in response to that:
automatically controlling a deformable handle element to affect haptics of a steering wheel rim of a steering wheel of the vehicle,
determining that the occupant has surrendered the driving task and, in response to that:
automatically restoring a previous state of the deformable handle element of the steering wheel rim of the steering wheel of the vehicle.

7. The method as claimed in claim 1, wherein
the affecting of the haptics of the steering wheel rim comprises a formation of a grip recess whose shape corresponds to the shape of a corresponding hand of the occupant.

8. The method as claimed in claim 7, wherein
the grip recess is formed at a position that is established by a determination by sensors of an actual position of a hand of the occupant.

9. An arrangement for a vehicle, comprising:
a steering wheel with a steering wheel rim;
a deformable handle element in the steering wheel rim; and
an evaluation unit with a signal input and a signal output, wherein
the evaluation unit is configured to:
determine, through the signal input, that an occupant of the vehicle has taken over a driving task from a highly automated driving mode and, in response to that, to automatically control through the signal output an ergonomically shaped deformation of the deformable handle element to affect haptics of the steering wheel rim of the steering wheel of the vehicle.

10. The arrangement as claimed in claim 9, wherein the arrangement is arranged in the vehicle.

\* \* \* \* \*